United States Patent
Pandev et al.

(10) Patent No.: US 10,295,342 B2
(45) Date of Patent: May 21, 2019

(54) SYSTEM, METHOD AND COMPUTER PROGRAM PRODUCT FOR CALIBRATION OF METROLOGY TOOLS

(71) Applicant: KLA-Tencor Corporation, Milpitas, CA (US)

(72) Inventors: Stilian Ivanov Pandev, Santa Clara, CA (US); Dzmitry Sanko, Vallejo, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 104 days.

(21) Appl. No.: 15/236,334

(22) Filed: Aug. 12, 2016

(65) Prior Publication Data

US 2017/0045356 A1    Feb. 16, 2017

Related U.S. Application Data

(60) Provisional application No. 62/205,337, filed on Aug. 14, 2015.

(51) Int. Cl.
G01B 21/04    (2006.01)

(52) U.S. Cl.
CPC ........ *G01B 21/042* (2013.01); *G01B 2210/56* (2013.01)

(58) Field of Classification Search
None
See application file for complete search history.

(56) References Cited

U.S. PATENT DOCUMENTS

| | | | |
|---|---|---|---|
| 5,543,919 A | 8/1996 | Mumola | |
| 5,608,526 A | 3/1997 | Piwonka-Corle et al. | |
| 5,859,424 A | 1/1999 | Norton et al. | |
| 6,110,214 A * | 8/2000 | Klimasauskas | G05B 13/027 700/30 |
| 6,429,943 B1 | 8/2002 | Opsal et al. | |
| 7,478,019 B2 | 1/2009 | Zangooie et al. | |
| 7,933,026 B2 | 4/2011 | Opsal et al. | |

(Continued)

FOREIGN PATENT DOCUMENTS

WO    03097290 A1    11/2003

OTHER PUBLICATIONS

Jiang et al., U.S. Appl. No. 14/294,540, filed Jun. 3, 2014.
International Search Report from International Application No. PCT/US2016/046939, dated Nov. 18, 2016.

*Primary Examiner* — Clayton E. LaBalle
*Assistant Examiner* — Geoffrey T Evans
(74) *Attorney, Agent, or Firm* — Zilka-Kotab, PC

(57) ABSTRACT

A system, method and computer program product are provided for calibrating metrology tools. One or more design-of-experiments wafers is received for calibrating a metrology tool. A set of signals is collected by measuring the one or more wafers utilizing the metrology tool. A first transformation is determined to convert the set of signals to components, and a second transformation is determined to convert a set of reference signals to reference components. The set of reference signals is collected by measuring the one or more wafers utilizing a well-calibrated reference tool. A model is trained based on the reference components that maps the components to converted components, and the model, first transformation, and second transformation are stored in a memory associated with the metrology tool.

12 Claims, 9 Drawing Sheets

(56) References Cited

U.S. PATENT DOCUMENTS

| | | |
|---|---|---|
| 9,291,554 B2 | 3/2016 | Kuznetsov et al. |
| 2003/0147070 A1 | 8/2003 | Sezginer et al. |
| 2006/0064280 A1 | 3/2006 | Vuong et al. |
| 2007/0288219 A1* | 12/2007 | Zafar .................. G03F 1/84 703/14 |
| 2013/0304424 A1* | 11/2013 | Bakeman ............ G03F 7/70625 702/189 |
| 2013/0305206 A1* | 11/2013 | Pandev ............... G06F 17/5081 716/136 |
| 2014/0111791 A1 | 4/2014 | Manassen et al. |
| 2014/0172394 A1 | 6/2014 | Kuznetsov et al. |
| 2014/0222380 A1 | 8/2014 | Kuznetsov et al. |
| 2014/0340682 A1* | 11/2014 | Kwak .................. G01N 21/211 356/369 |
| 2015/0058813 A1 | 2/2015 | Kim et al. |
| 2016/0282105 A1* | 9/2016 | Pandev ............... G01B 11/0616 |
| 2017/0045356 A1* | 2/2017 | Pandev ................ G01B 21/042 |
| 2018/0108578 A1* | 4/2018 | Pandev ............... G01B 11/0625 |

* cited by examiner

SYSTEM, METHOD AND COMPUTER PROGRAM PRODUCT FOR CALIBRATION OF METROLOGY TOOLS

RELATED APPLICATION(S)

This application claims the benefit of U.S. Provisional Patent Application No. 62/205,337 filed Aug. 14, 2015, the entire contents of which are incorporated herein by reference.

FIELD OF THE INVENTION

The present invention relates to metrology tools, and more particularly to calibration of metrology tools.

BACKGROUND

Metrology generally involves measuring various physical features of a target component. For example, structural and material characteristics (e.g. material composition, dimensional characteristics of structures and/or critical dimensions of structures, etc.) of the target component can be measured using metrology tools such as scatterometers, ellipsometers, or scanning electron microscopes (SEMs). In the example of semiconductor metrology, various physical features of a fabricated semiconductor component may be measured using a metrology tool.

Once a metrology measurement is obtained, the measurement may be analyzed. This analysis typically involves a library having predefined value(s) for parameters specific to the target component (i.e. a parametric model of the target component). In particular, the library may include value ranges for floating parameters. The library may then be used to provide a fast mathematical approximation that can quickly reproduce the solution of a system having the target component with a reasonable accuracy, given the set of values for the parametric model.

Conventional techniques of calibrating the metrology tools include mechanical calibration of the metrology tool by adjusting various system parameters. For example, the metrology tool may be calibrated by adjusting a focal length of an optical system, adjusting an orientation of polarization, or adjusting other physical system parameters. Some techniques may also require the performance of an optimization procedure to minimize the difference between signals generated by a reference tool and signals generated by a calibrated tool. These optimization procedures are typically limited to adjusting a small number of physical parameters associated with the metrology tool being calibrated until a difference between the signals generated by the metrology tool and a set of reference signals generated by a reference tool are minimized. However, because the optimization procedures typically use a limited number of physical parameters, there may still be significant differences between the signal produced by the calibrated metrology tool and the reference signals. Therefore, there is a need for addressing these and/or other issues associated with the prior art implementations of inspection systems.

SUMMARY

A system, method and computer program product are provided for calibrating metrology tools. One or more design-of-experiments wafers is received for calibrating a metrology tool. A set of signals is collected by measuring the one or more wafers utilizing the metrology tool. A first transformation is determined to convert the set of signals to components, and a second transformation is determined to convert a set of reference signals to reference components. The set of reference signals is collected by measuring the one or more wafers utilizing a well-calibrated reference tool. A model is trained based on the reference components that maps the components to converted components, and the model, first transformation, and second transformation are stored in a memory associated with the metrology tool.

DETAILED DESCRIPTION

In the field of semiconductor metrology, a metrology tool may comprise an illumination system which illuminates a target, a collection system which captures relevant information provided by the illumination system's interaction (or lack thereof) with a target, device or feature, and a processing system which analyzes the information collected using one or more algorithms. Metrology tools can be used to measure structural and material characteristics e.g. material composition, dimensional characteristics of structures and films such as film thickness and/or critical dimensions of structures, overlay, etc.) associated with various semiconductor fabrication processes. These measurements are used to facilitate process controls and/or yield efficiencies in the manufacture of semiconductor dies.

The metrology tool can comprise one or more hardware configurations which may be used in conjunction with certain embodiments of this invention to, e.g., measure the various aforementioned semiconductor structural and material characteristics. Examples of such hardware configurations include, but are not limited to, the following:

Spectroscopic ellipsometer (SE);

SE with multiple angles of illumination;

SE measuring Mueller matrix elements (e.g. using rotating compensator(s));

Single-wavelength ellipsometers;

Beam profile ellipsometer (angle-resolved ellipsometer);

Beam profile reflectometer (angle-resolved reflectometer);

Broadband reflective spectrometer (spectroscopic reflectometer);

Single-wavelength reflectometer;

Angle-resolved reflectometer;

Imaging system;

Scatterometer (e.g. speckle analyzer);

Small-angle X-ray scattering (SAXS) device;

X-ray powder diffraction (XRD) device;

X-ray Fluorescence (XRF) device;

X-ray photoelectron spectroscopy (XPS) device;

X-ray reflectivity (XRR) device;

Raman spectroscopy device;

scanning electron microscopy (SEM) device;

tunneling electron microscopy (TEM) device; and atomic force microscope (AFM) device.

Figure 1:
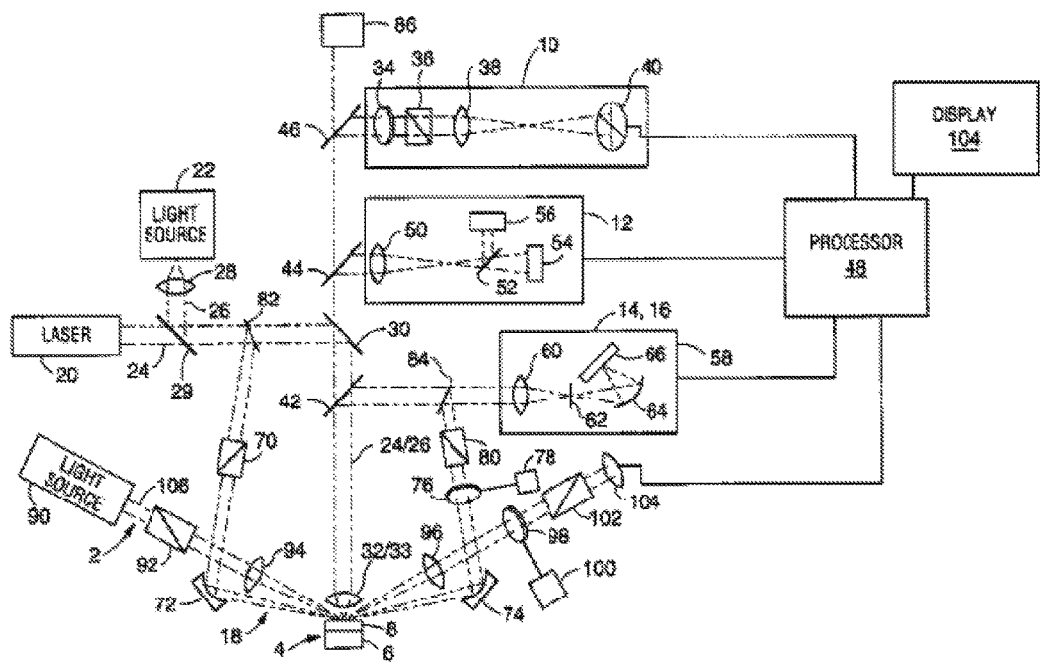
FIG. 1 shows a schematic of an exemplary metrology tool, in accordance with the prior art.

The hardware configurations can be separated into discrete operational systems. On the other hand, one or more hardware configurations can be combined into a single tool. One example of such a combination of multiple hardware configurations into a single tool is shown in FIG. 1, incorporated herein from U.S. Pat. No. 7,933,026 which is hereby incorporated by reference in its entirety for all purposes. FIG. 1 shows, for example, a schematic of an exemplary metrology tool that comprises: a) a broadband SE (i.e., 18); b) a SE (i.e., 2) with rotating compensator (i.e., 98); c) a beam profile ellipsometer (i.e., 10); d) a beam profile reflectometer (i.e., 12); e) a broadband reflective spectrometer (i.e., 14); and f) a deep ultra-violet reflective spectrometer (i.e., 16). In addition, there are typically numerous optical elements in such systems, including certain lenses, collimators, mirrors, quarter-wave plates; polarizers, detectors; cameras, apertures, and/or light sources. The wavelengths for optical systems can vary from about 120 nm to 3 microns. For non-ellipsometer systems, signals collected can be polarization-resolved or unpolarized. FIG. 1 provides an illustration of multiple metrology heads integrated on the same tool. However, in many cases, multiple metrology tools are used for measurements on a single or multiple metrology targets. This is described, for example, in U.S. Pat. No. 7,478,019, "Multiple tool and structure analysis," which is also hereby incorporated by reference in its entirety for all purposes.

The illumination system of the certain hardware configurations includes one or more light sources. The light source may generate light having only one wavelength (i.e., monochromatic light), light having a number of discrete wavelengths (i.e., polychromatic light), light having multiple wavelengths (i.e., broadband light) and/or light that sweeps through wavelengths, either continuously or hopping between wavelengths (i.e. tunable sources or swept source), Examples of suitable light sources are: a white light source, an ultraviolet (UV) laser, an arc lamp or an electrode-less lamp, a laser sustained plasma (LSP) source, for example those commercially available from Energetiq Technology, Inc., Woburn, Mass., a super-continuum source such as a broadband laser source) such as those commercially available from NKT Photonics Inc., Morganville, N.J., or shorter-wavelength sources such as x-ray sources, extreme UV sources, or some combination thereof. The light source may also be configured to provide light having sufficient brightness, which in sonic cases may be a brightness greater than about 1 W/(nm cm$^2$ Sr). The metrology system may also include a fast feedback to the light source for stabilizing its power and wavelength. Output of the light source can be delivered via free-space propagation, or in some cases delivered via optical fiber or light guide of any type.

The metrology tool is designed to make many different types of measurements related to semiconductor manufacturing. Certain embodiments may be applicable to such measurements. For example, in certain embodiments the tool may measure characteristics of one or more targets, such as critical dimensions, overlay, sidewall angles, film thicknesses, process-related parameters (e.g., focus and/or dose). The targets can include certain regions of interest that are periodic in nature, such as for example gratings in a memory die. Targets can include multiple layers (or films) whose thicknesses can be measured by the metrology tool. Targets can include target designs placed (or already existing) on the semiconductor wafer for use, e.g., with alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or at differing times) by the same or multiple metrology tools as described in U.S. Pat. No. 7,478,019. The data from such measurements may be combined. Data from the metrology tool is used in the semiconductor manufacturing process for example to feed-forward, feed-backward and/or feed-sideways corrections to the process e.g. lithography, etch) and therefore, might yield a complete process control solution.

As semiconductor device pat tem dimensions continue to shrink, smaller metrology targets are often required, Furthermore, the measurement accuracy and matching to actual device characteristics increase the need for device-like targets as well as in-die and even on-device measurements. Various metrology implementations have been proposed to achieve that goal. For example, focused beam ellipsometry based on primarily reflective optics is one of them and described in the patent by Piwonka-Corle et al. (U.S. Pat. No. 5,608,526, "Focused beam spectroscopic ellipsometry method and system"). Apodizers can be used to mitigate the effects of optical diffraction causing the spread of the illumination spot beyond the size defined by geometric optics. The use of apodizers is described in the patent by Norton, U.S. Pat. No. 5,859,424, "Apodizing filter system useful for reducing spot size in optical measurements and other applications". The use of high-numerical-aperture tools with simultaneous multiple angle-of-incidence illumination is another way to achieve small-target capability. This technique is described, e.g. in the patent by Opsal et al, U.S. Pat. No. 6,429,943, "Critical dimension analysis with simultaneous multiple angle of incidence measurements".

Other measurement examples may include measuring the composition of one or more layers of the semiconductor stack, measuring certain defects on (or within) the wafer, and measuring the amount of photolithographic radiation exposed to the wafer. In some cases, the metrology tool and algorithm may be configured for measuring non-periodic targets, see e.g. "The Finite Element Method for Full Wave Electromagnetic Simulations in CD Metrology Using Scatterometry" by P. Jiang et al (pending U.S. patent application Ser. No. 14/294,540, filed Jun. 3, 2014, attorney docket no. P0463) or "Method of electromagnetic modeling of finite structures and finite illumination for metrology and inspection" by A. Kuznetsov et al. (pending U.S. patent application Ser. No. 14/170,150, ).

Measurement of parameters of interest usually involves a number of algorithms. For example, optical interaction of the incident beam with the sample is modeled using EM (electro-magnetic) solver and uses such algorithms as RCWA, FEM, method of moments, surface integral method, volume integral method, FDTD, and others. The target of interest is usually modeled (parameterized) using a geometric engine, or in some cases, a process modeling engine or a combination of both. The use of process modeling is described in "Method for integrated use of model-based metrology and a process model," by A. Kuznetsov et al. (pending U.S. patent application Ser. No. 14/107,850, ). A geometric engine is implemented, for example, in AcuShape software product of KLA-Tencor.

Collected data can be analyzed by a number of data fitting and optimization techniques and technologies including libraries; Fast-reduced-order models; regression; machine-learning algorithms such as neural networks and support-vector machines (SVM); dimensionality-reduction algorithms such as, e.g., PCA (principal component analysis), ICA (independent component analysis), LLE (local-linear embedding); sparse representation such as Fourier or wavelet transform; Kalman filter; algorithms to promote matching from same or different tool types, and others.

Collected data can also be analyzed by algorithms that do not include modeling, optimization and/or fitting e.g. U.S. patent application Ser. No. 14/057,827.

Computational algorithms are usually optimized for metrology applications with one or more approaches being used such as design and implementation of computational hardware, parallelization, distribution of computation, load-balancing, multi-service support, dynamic load optimization, etc. Different implementations of algorithms can be done in firmware, software, FPGA, programmable optics components, etc.

The data analysis and fitting steps usually pursue one or more of the following goals:

Measurement of CD, SWA, shape, stress, composition, films, band-gap, electrical properties, focus/dose, overlay, generating process parameters e.g., resist state, partial pressure, temperature, focusing model), and/or any combination thereof;

Modeling and/or design of metrology systems; and

Modeling, design, and/or optimization of metrology targets.

The following description discloses embodiments of a method, a system (having a processor for performing the method), and a computer program product (embodied on a non-transitory computer readable medium and having code adapted to be executed by a computer to perform the method) for calibrating one or more metrology tools.

The metrology tools may be any of those described above with reference to FIG. 1 or may be other types of metrology tools. A plurality of metrology tools may reside on a single hardware platform or different hardware platforms. When on a single hardware platform, a processor of a computer system residing on the same or different hardware platform is in communication with the metrology tools to perform the methods described with respect to the subsequent figures below. When on different hardware platforms, the processor of the computer may reside on one of the hardware platforms having one of the metrology tools or may reside on an entirely different platform, but again, is in communication with the metrology tools to perform the methods described with respect to the subsequent figures below.

The techniques described below utilize machine learning algorithms in order to learn how the signals from a tool under calibration can be transformed into signals of a well-calibrated reference tool or into theoretical well-calibrated signals generated by a simulator module. The technique may be separated into two discrete parts: (1) calibrating the metrology tool to determine a set of calibration parameters; and (2) taking measurements based on the set of calibration parameters.

Figure 2:
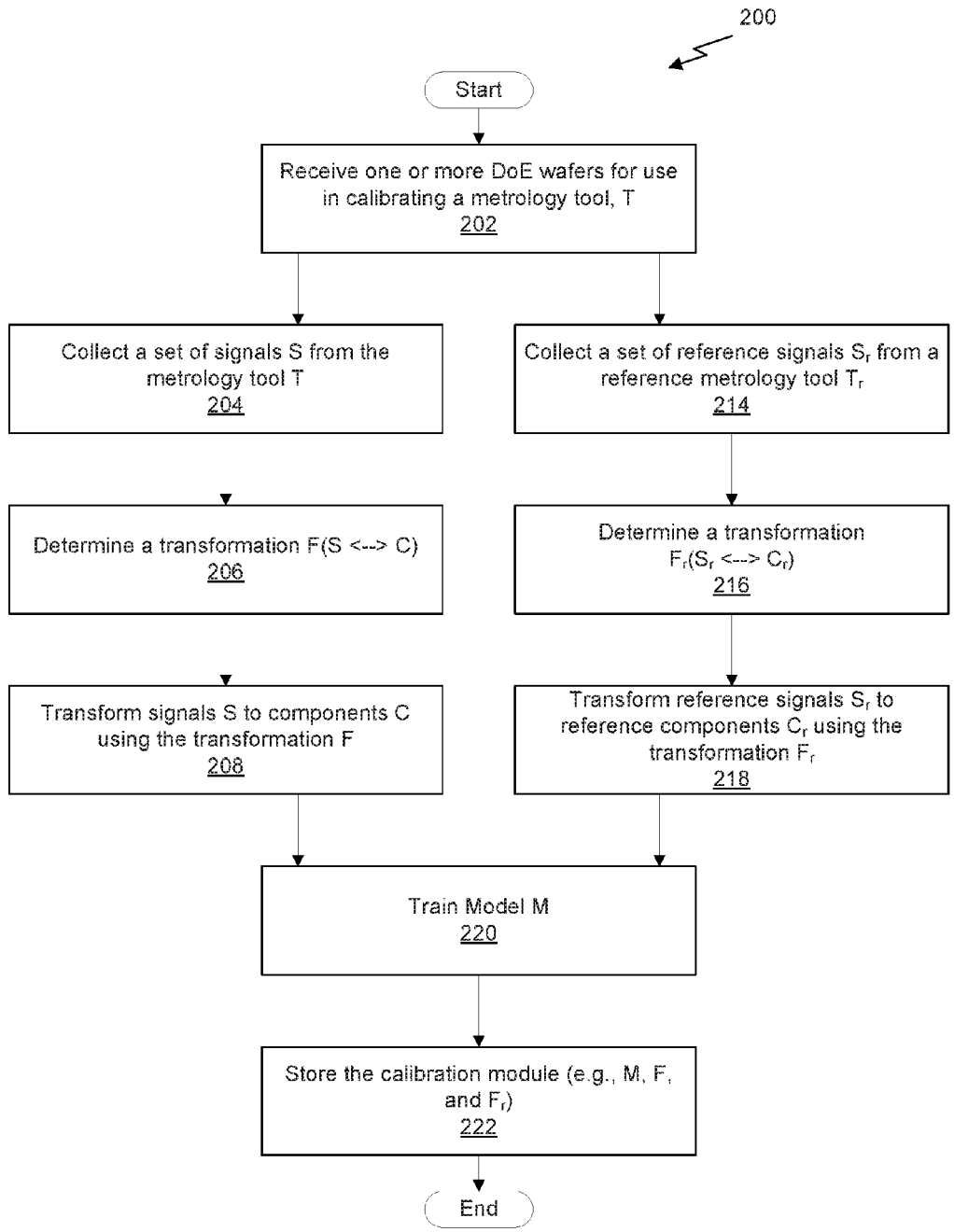
FIG. 2 illustrates a method for calibrating a metrology tool using machine learning, in accordance with one embodiment.

FIG. 2 illustrates a method 200 for calibrating a metrology tool using machine learning, in accordance with one embodiment. At step 202, one or more DoE (design-of-experiments) wafers are received for use in calibrating a metrology tool (such as metrology tool 2, 10, 12, 14, 16, or 18 of FIG. 1). A DoE wafer is a silicon wafer that includes one or more metrology targets to be measured using the metrology tool. The metrology targets refer to structures fabricated on the DoE wafer, which may be designed and fabricated utilizing different process parameters and may be placed at various locations on the wafer. For example, wavelength process parameters may be adjusted during lithography processes, partial pressure or flow rate parameters may be adjusted during plasma enhanced chemical vapor deposition (PECVD), dimension parameters may be adjusted to make larger or smaller structures, time parameters may be adjusted to increase the thickness of particular deposited layers, and so forth. Thus, each DoE wafer is associated with a set of process parameters that produces a finished DoE wafer having a plurality of metrology targets included therein. Examples of metrology targets may include, but are not limited to, a periodic grating, a FinFet structure, an SRAM device structure, a Flash memory structure, and a DRAM memory structure.

The one or more DoE wafers are used to collect signals from a metrology tool under calibration (referred to herein as tool T) as well as a reference tool (referred to herein as tool $T_r$). The reference tool $T_r$ refers to a well-calibrated metrology tool that produces signals that can be analyzed to determine structure parameters of the metrology targets. A recipe may refer to an algorithm for analyzing a set of signals to determine the structural parameters of a metrology target. For example, a recipe may refer to an algorithm for analyzing a set of signals from a scatterometer to determine a thickness of a metrology target. A recipe is tool dependent arid calibrated to a set of reference signals generated by the reference tool $T_r$. It will be appreciated that the calibration routine may be performed for any of the metrology tools described above, but both the metrology tool T and the reference tool $T_r$ refer to the same type of metrology tool, the latter being well-calibrated and used as a reference and the former undergoing calibration.

As shown in FIG. 2, at step 204, the one or more DoE wafers can be measured by the metrology tool T to collect a set of signals S. The set of signals S may refer to a spectra measured by the metrology tool T. The particular format of the signals S depends on the type of metrology tool being calibrated. For example, the set of signals may refer to an intensity of light measured by a detector as a beam of light is focused on different locations L associated with a metrology target(s). At step 206, a transformation F is determined that transforms signals S into components C. The transformation F may be determined based on the set of signals S. In one embodiment, the set of signals S are analyzed using principal component analysis (PCA) to determine the principal components of the set of signals S. The principal components are then utilized to fit a transformation F to the set of signals S that results in a close fit to the principal components. In other embodiments, techniques other than PCA may be utilized to find the transformation F based on the set of signals S, such as ICA, kernel PCA, or trained auto-encoders. At step 208, signals S are converted into components C based on the transformation F. It will be appreciated that the number of components C may be larger than the number of principal components identified using PCA (or some other technique) and utilized to determine the transformation F.

At step 214, the one or more DoE wafers are measured by the reference tool $T_r$ to generate a set of reference signals $S_r$. The set of reference signals $S_r$ may refer to a spectra measured by the reference tool $T_r$. At step 216, a transformation $F_r$ is determined that transforms the set of reference signals $S_r$ into reference components $C_r$. The transformation $F_r$ may be determined based on the set of reference signals $S_r$, in a similar manner to the technique described above in step 206. At step 218, the set of reference signals $S_r$ are converted into reference components $C_r$ based on the transformation $F_r$. Steps 214 through 218 may be performed in parallel with steps 204 through 208 when there is more than one DoE wafer utilized to generate the signals S and $S_r$. Of course, steps 214 through 218 may be performed prior to or subsequent to steps 204 through 208 as well. In other words, it is readily apparent that only one tool may measure a particular metrology target on a particular DoE wafer at a time, but measurements of multiple metrology targets on multiple DoE wafers utilizing both the reference tool $T_r$ and the metrology tool T can be performed in parallel by measuring different metrology targets by the reference tool $T_r$ and the metrology tool T at the same time.

In one embodiment, the transformations F and $F_r$, incorporate noise reduction. For example, a filter may be applied to the signals before the filtered signals are converted to components. The filter may be a low-pass filter applied to the raw signal data. Other noise reduction techniques may be implemented within the transformations F and $F_r$ as well.

At step 220, a model M is trained. The model M refers to an algorithm that maps components measured by the metrology tool T to converted components that, in an ideal scenario where the metrology tool was perfectly calibrated, would match the reference components $C_r$ measured by the reference tool $T_r$. Training the model M refers to correcting the model M based on the set of signals S and set of reference signals $S_r$, collected by the metrology tool T and the reference tool $T_r$, respectively. In some embodiments, training the model M refers to correcting the model M based on the components C and reference components $C_r$ collected by the metrology tool T and the reference tool $T_r$, respectively.

The model M is trained based on a machine learning algorithm, which may be either linear or non-linear. In one embodiment, the model M is trained in order to minimize the difference between the output of the model M (i.e., converted components) and the reference components $C_r$ by optimizing a set of model parameters $\tilde{w}$, as shown in Equations 1 and 2. The model M is a linear model utilized to predict modeled components $\tilde{C}$ based on the components C as measured by the metrology tool T. Again, the set of signals S are transformed into the components C. Therefore, training the model M involves solving Equation 2 by adjusting the set of model parameters $\tilde{w}$, which may also be referred to herein as model coefficients $\tilde{w}$.

$$\tilde{C}=M(C,\tilde{w}) \qquad \text{(Eq. 1)}$$

$$w=\arg\min_{\tilde{w}}\|M(C,\tilde{w})-C_r\|_2^2 \qquad \text{(Eq. 2)}$$

Techniques for selecting the set of model parameters $\tilde{w}$ that solves Equation 2 are well known in the art. Some techniques include solving a set of linear equations, QR decomposition, singular value decomposition, as well as other well-known techniques or algorithms. In one embodiment, Equation 2 is solved utilizing a back-propagation algorithm combined with differential evolution.

In another embodiment, the model M is trained in order to minimize the difference between parameter values estimated using components C and reference components $C_r$, as shown in Equation 3. The function G is the function that performs the measurement; i.e., the recipe for determining structural parameters P' from the set of signals S' collected by the metrology tool T. So, Equation 3 takes the components C and the reference components $C_r$, transforms the components into corresponding signals via transformation F and reference transformation $F_r$, converts the transformed signals into structural parameters via function G (i.e., the recipe), and then minimizes the difference between structural parameters by adjusting the set of model parameters $\tilde{w}$.

$$w=\arg\min_{\tilde{w}}\|G(F(M(C,\tilde{w})))-G(F_r(C_r))\|_2^2 \qquad \text{(Eq. 3)}$$

In yet another embodiment, the model M is a neural network that is trained by an iterative process. For each set of signals S collected by the metrology tool T, the model coefficients $\tilde{w}$ are adjusted in order to minimize the difference between the output of the model M and the reference components $C_r$. In one embodiment, the current model parameters w are utilized to calculate predicted components $\tilde{C}$ that are compared to the desired reference components $C_r$. A difference between the predicted components e and the desired reference components $C_r$ are fed back into the neural network. The model parameters are then adjusted by the difference between the predicted components $\tilde{C}$ and the desired reference components $C_r$, after scale factors are applied. It will be appreciated that the neural network is non-linear and that the model parameters $\tilde{w}$ are adjusted each time a measurement is taken with the metrology tool. Other techniques for training the neural network are within the scope of this embodiment. In still yet other embodiments, the model M may be one of a random forest, a support vector machine (SVM), a deep network, and a convolution network.

At step 222, a calibration module is stored in a memory associated with the metrology tool. The calibration module may include the model parameters $\tilde{w}$ that define the model M as well as parameters that define the transformation F and the transformation $F_r$. The calibration module may be loaded into a memory associated with the metrology tool T when a measurement of a wafer (i.e., a production wafer) with one or more metrology targets is going to be taken.

Figure 3:
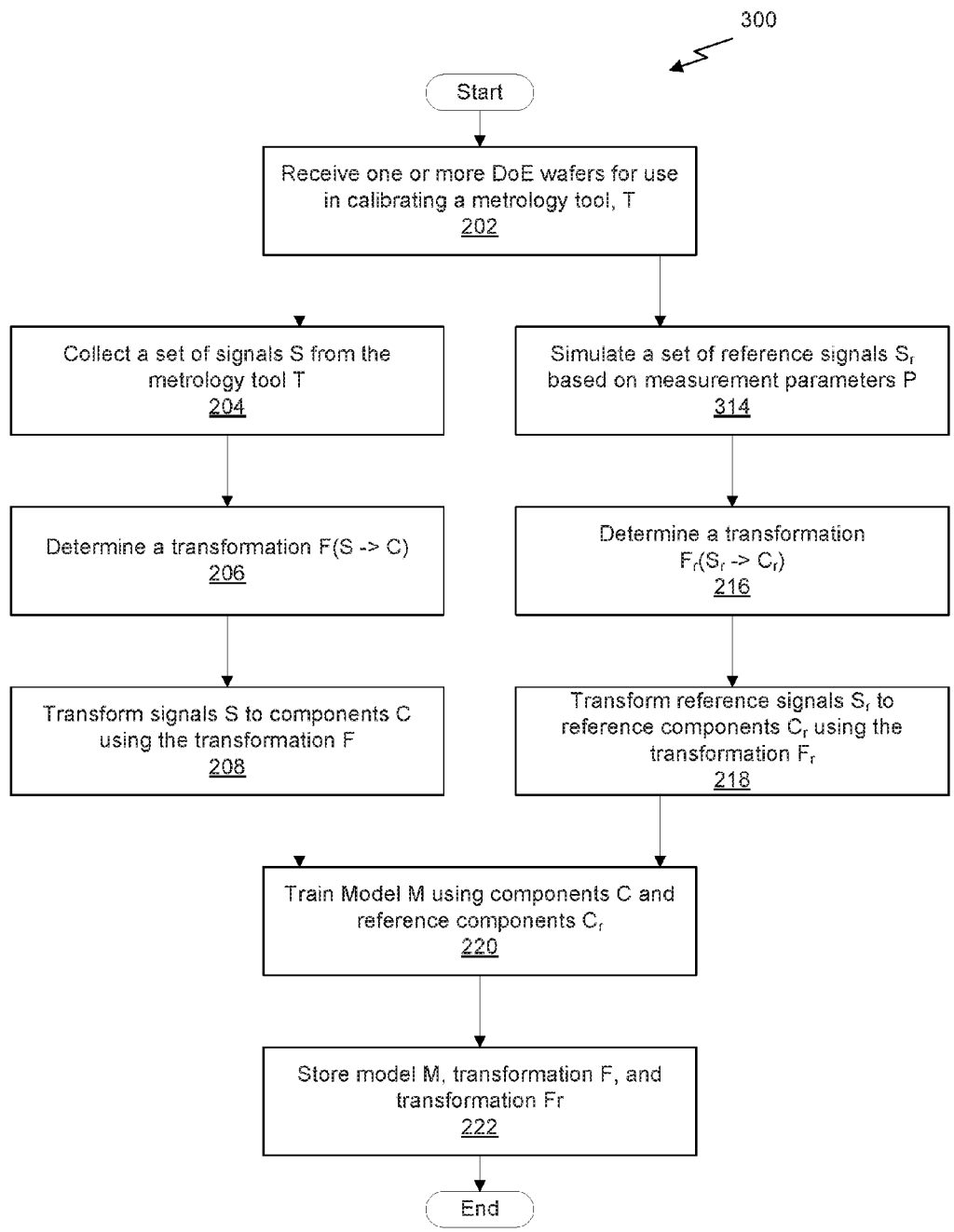
FIG. 3 illustrates a method for calibrating a metrology tool using machine learning, in accordance with another embodiment.

FIG. 3 illustrates a method 300 for calibrating a metrology tool using machine learning, in accordance with another embodiment. The method 300 is similar to the method 200 except that step 214 is replaced by step 314. The steps 202 through 222 of method 200 are the same as similarly labeled steps 200 through 222 of method 300.

In step 214 of method 200, the one or more DoE wafers are measured by the reference tool $T_r$ to generate a set of reference signals $S_r$. In contrast, at step 314 of method 300, the set of reference signals $S_r$ is simulated based on measurement parameters. The measurement parameters may include a set of parameters associated with the metrology tool (e.g., a wavelength of light, a focal length, an incident angle, etc.). The measurement parameters P may also include structural parameters of the metrology targets of the DoE wafer(s) as measured by one or more reference metrologies. For example, a film thickness could be measured using scatterometry, critical dimensions (CDs) could be measured using CD-SEM (Critical Dimension Scanning Electron Microscope), and a profile could be measured using TEM (Tunneling Electron Microscope). These structural parameter values collected by a variety of types of metrology tools may then be utilized to simulate the set of reference signals $S_r$.

The measurement parameters are received by a simulator module that is configured to simulate the set of reference signals $S_r$. The simulator module may be configured to output a particular set of reference signals $S_r$ based on the measurement parameters. The simulated signals may have a lower signal to noise ration than the signals generated by a reference tool $T_r$, even one that is calibrated well. In one embodiment, the simulator module is a software module that implements an algorithm for performing calculations based on the input measurement parameters in order to simulate the reference signals $S_r$. In another embodiment, the simulator module is a hardware module that reads the measurement parameters from a memory and then generates a set of reference signals, which are read in through hardware (i.e., I/O cards, Analog-to-Digital Converters (ADCs), etc.) that emulates a reference tool.

Figure 4:
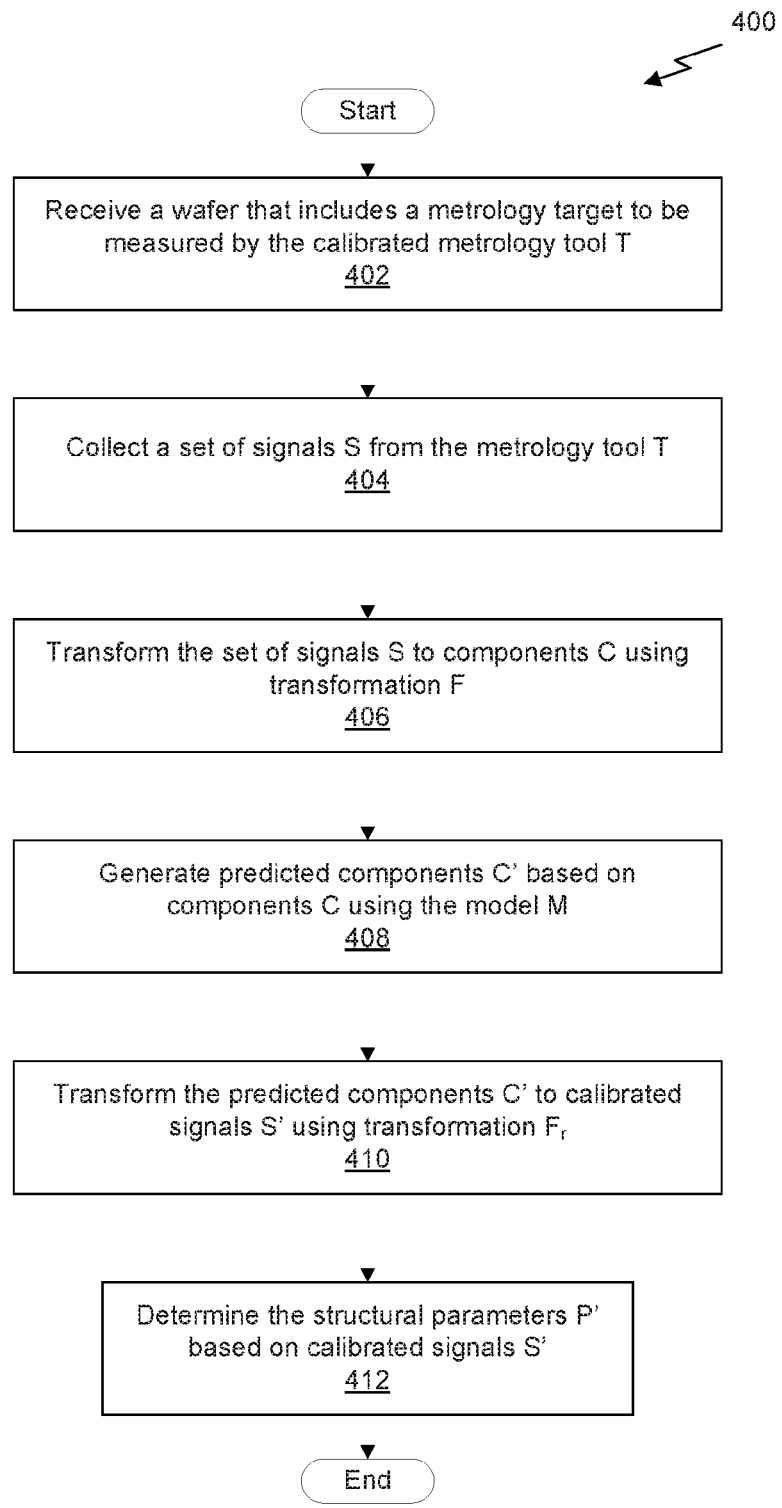
FIG. 4 illustrates a method for taking measurements using a calibrated metrology tool, in accordance with one embodiment.

FIG. 4 illustrates a method 400 for taking measurements using a calibrated metrology tool, in accordance with one embodiment. At step 402, a wafer is received that includes one or more metrology targets to be measured in order to determine a set of structural parameters P' associated with the metrology target(s). At step 404, the calibrated metrology tool T is utilized to collect a set of signals S by applying the metrology tool T to the metrology target. Applying the metrology tool T to the metrology target may refer to utilizing the metrology tool T to take a measurement. For example, if the metrology tool T is an ellipsometer, then utilizing the metrology tool T to take a measurement includes the steps of activating a light source such that a beam of light passes through a polarizer and strikes the metrology target at a particular orientation. A detector receives the beam of light and generates a signal depending on the strength of the light reaching the detector. The beam of light passes through a second polarizer after being reflected off the metrology target and prior to reaching the detector such that a change in polarization of the light beam as it strikes the metrology target can be measured. Of course, the type and number of components and the manner of operation of a particular metrology tool may vary depending on the particular implementation of the metrology tool. It will be appreciated that different metrology tools may specify different techniques for taking measurements. The set of signals S may include values that represent measurements associated with different parameters associated with the metrology tool, such as different wavelengths of light, different incident angles, different focal lengths, and so forth.

At step 406, the set of signals S is transformed into components C using the transformation F. The transformation F is stored in a memory associated with the metrology tool T as a calibration module for the metrology tool. In one embodiment, the metrology tool T stores a single calibration module for all measurements. In another embodiment, the metrology tool T stores a plurality of calibration modules corresponding to different setups or types of measurements. The particular calibration module to utilize for taking a specific measurement may be specified by a user or selected automatically based on a set of criteria, such as the types of measurements being taken or the measurement parameters utilized for a particular measurement. At step 408, the model M is utilized to generate predicted components C' based on the measured components C. At step 410, the predicted components C' are transformed into a set of calibrated signals S' based on the transformation $F_r$, as shown in Equation 4. The set of calibrated signals S' are intended to essentially match the set of reference signals $S_r$, that would theoretically have been measured if the metrology target were measured with the reference tool $T_r$, instead of the calibrated metrology tool T. At step 412, the set of calibrated signals S' are analyzed to determine at least one structural parameter P' of the metrology target. For example, if the metrology tool T is a scatterometry tool, then a model-based OCD (Optical Critical Dimension) could be used to determine the structural parameter P' of the metrology target.

$$S'=F_r(M(F(S), w)) \qquad \text{(Eq. 4)}$$

It will be appreciated that the calibration module is loaded into a memory associated with the metrology tool T prior to taking the measurement and that a processor configured to analyze the signals S collected during the measurement can access the calibration module from the memory in order to perform various operations associated with the steps of method 400.

Figure 5A:
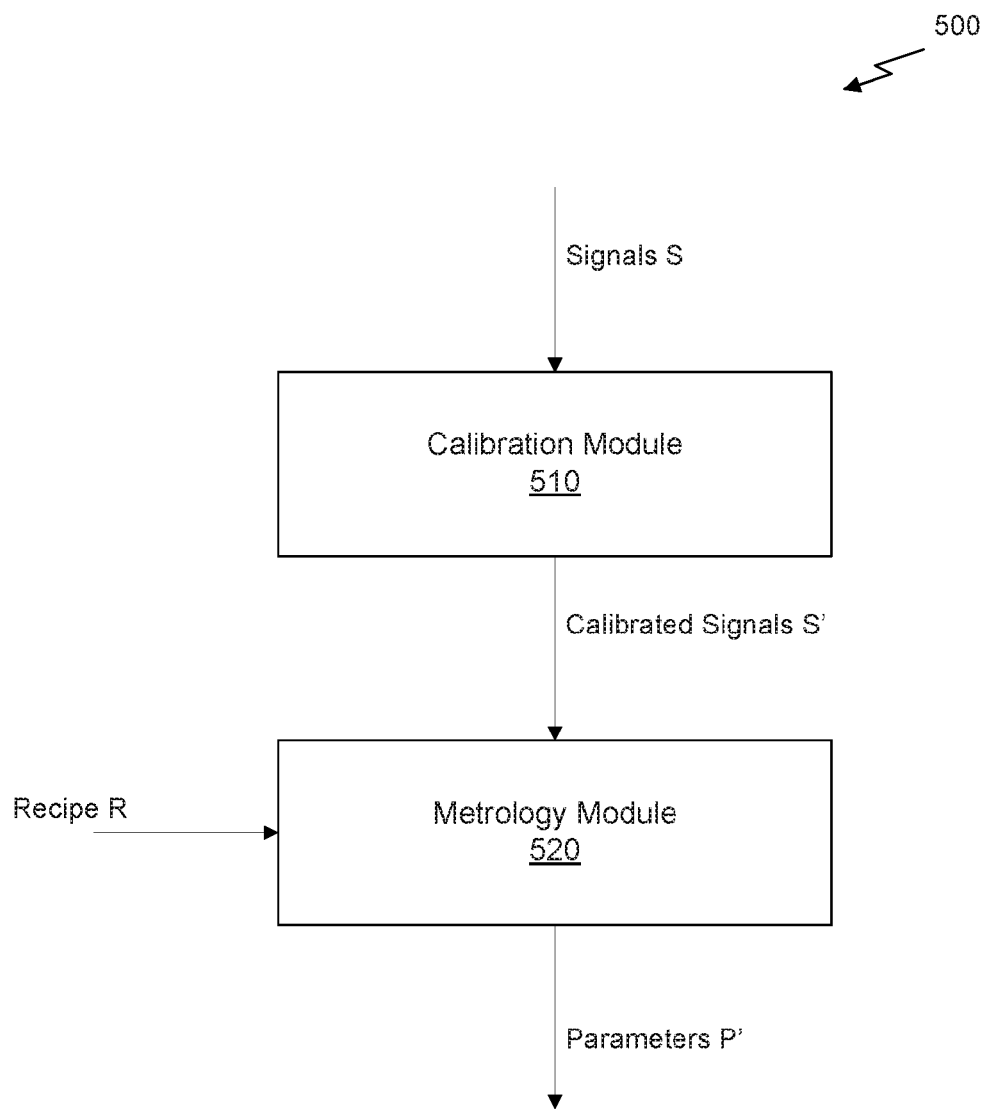
FIG. 5A is a conceptual illustration of a system for measuring a metrology target, in accordance with one embodiment.

FIG. 5A is a conceptual illustration of a system 500 for measuring a metrology target, in accordance with one embodiment. As shown in FIG. 5A, the system 500 includes a calibration module 510 and a metrology module 520. The calibration module 510 receives the set of signals S and converts the signals S into corresponding set of calibrated signals S' via the transformations F and $F_r$, as well as model M. The metrology module 520 receives the corresponding set of calibrated signals S' and generates the structural parameters P' based on a recipe R. The recipe R is an algorithm that specifies a mapping of calibrated signals S' to parameters P'. The recipe R is tool specific and may be stored in a S' associated with the metrology tool T.

It will be appreciated that the calibration module 510 in system 500 is layer unaware. in other words, the calibration module 510 does not have access to the recipe R. Thus, converting the signals S into the corresponding set of calibrated signals S' is performed independent from the recipe R.

Figure 5B:
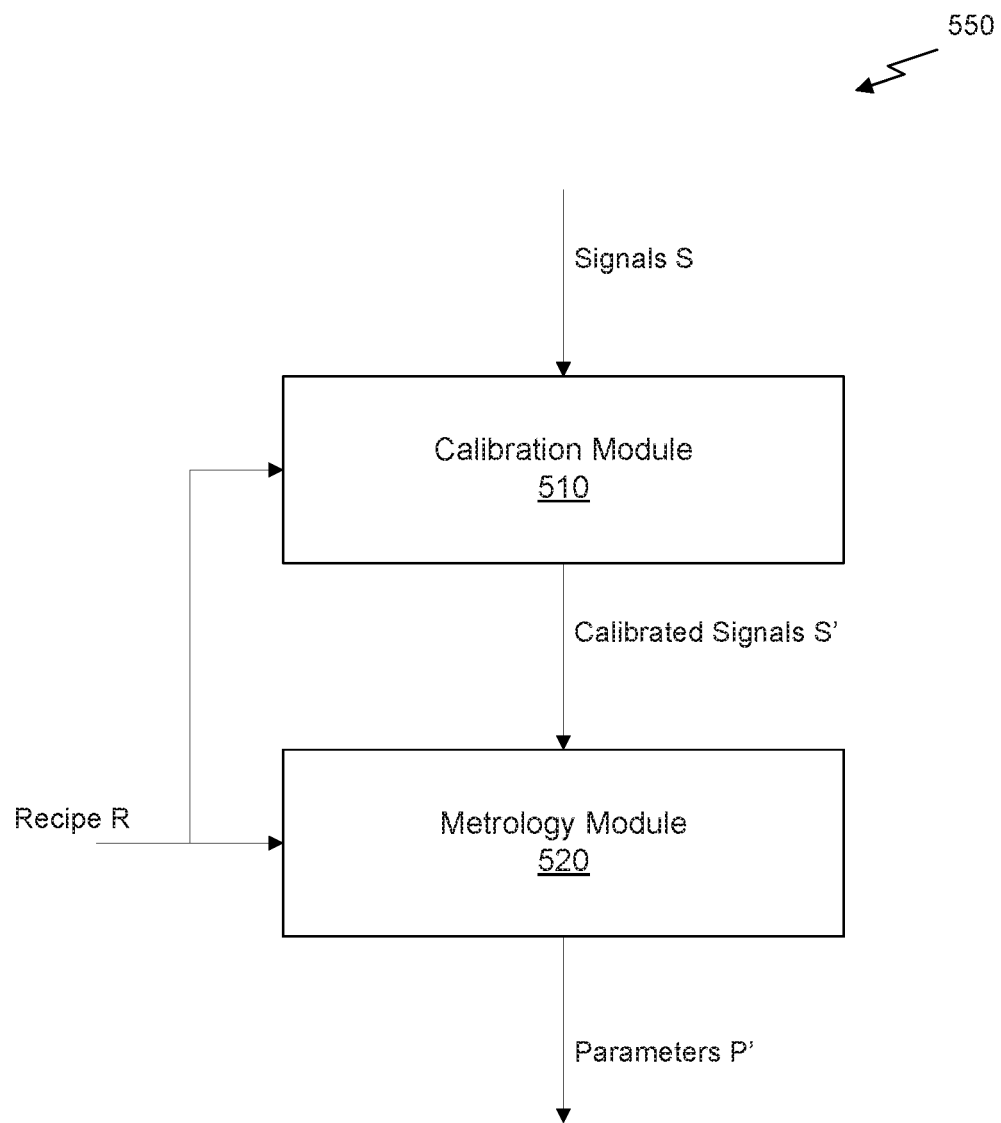
FIG. 5B is a conceptual illustration of a system for measuring a metrology target, in accordance with one embodiment.

FIG. 5B is a conceptual illustration of a system 550 for measuring a metrology target, in accordance with one embodiment. The system 550 differs from the system 500 in that the calibration module 510 is layer aware; i.e., the calibration module 510 may access the recipe R associated with a particular metrology tool T. Thus, the calibration routine, and therefore the transformations F and $F_r$ as well as the model M may be adjusted based on the recipe R. In other words, separate calibration modules 510 can be designed for each particular recipe in order to get more accurate results when converting the signals S into the calibrated signals S'.

It will be appreciated that the systems 500 or 550 may be repeated for each of multiple metrology tools. For example, each metrology tool shown in FIG. 1 may be associated with a separate and distinct calibration module 510 and corresponding metrology module 520. These modules may be operated in parallel in order to collect signals S for each of the multiple metrology tools T.

Figure 6A:
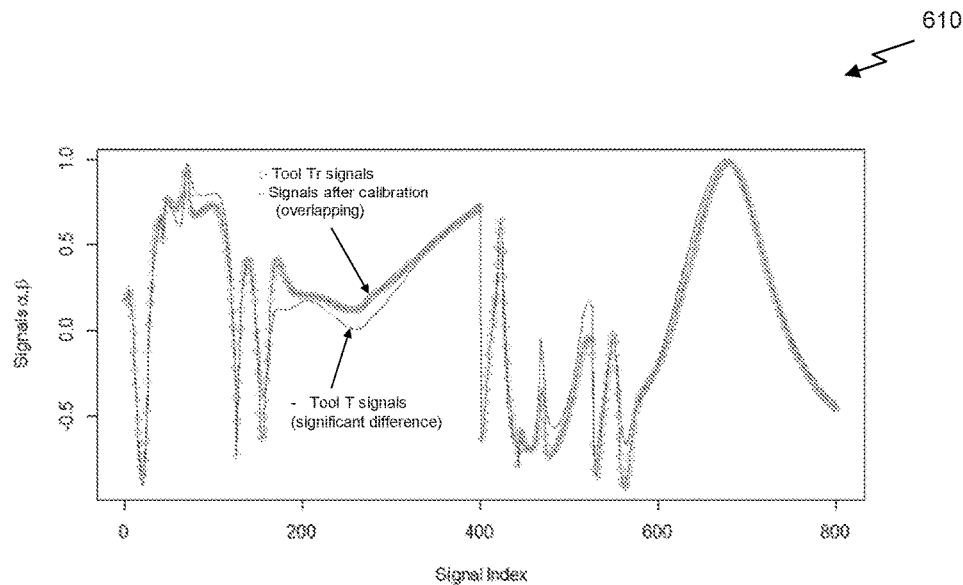
FIG. 6A illustrates a chart of a set of signals from a metrology tool before and after calibration of the metrology tool, in accordance with one embodiment.

FIG. 6A illustrates a chart 610 of a set of signals from a metrology tool before and after calibration of the metrology tool, in accordance with one embodiment. As shown in FIG. 6A, the same measurements may be taken with the metrology tool T and the reference tool $T_r$. The difference between the set of signals S from the metrology tool T and the set of reference signals $S_r$ from the reference tool $T_r$ is significant before the calibration is performed. However, when the set of signals S is converted by the calibration module into the set of calibrated signals S', the set of calibrated signals S' more closely resembles the set of reference signals $S_r$ (i.e., the difference between the set of calibrated signals S' and the set of reference signals $S_r$ is below a threshold). Thus, the measurement taken by the metrology tool T will more closely resemble a theoretical measurement taken by the reference tool $T_r$.

Figure 6B:
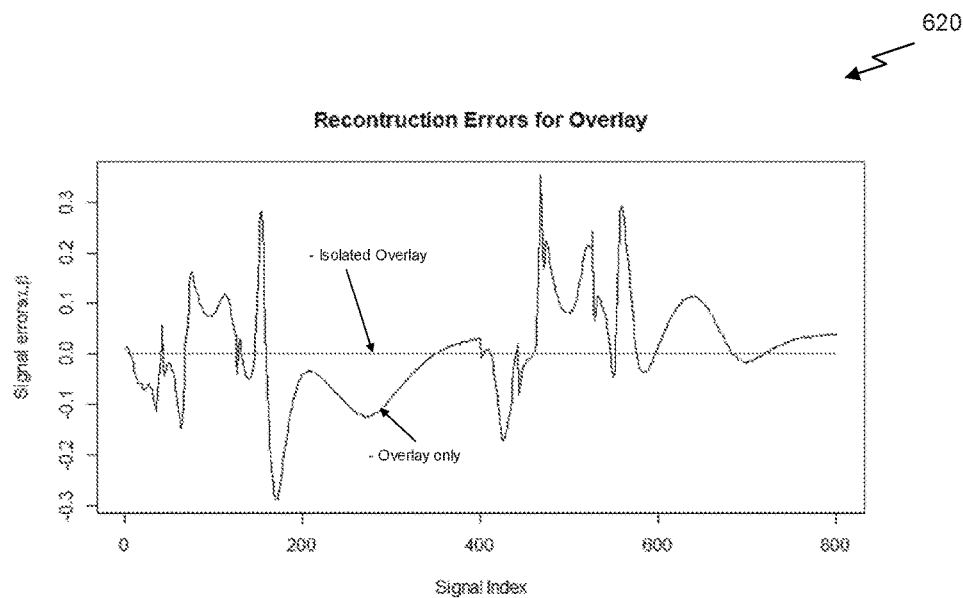
FIG. 6B illustrates a chart of the error between a set of converted signals after calibration of the metrology tool and a set of reference signals, in accordance with one embodiment.
Figure 6C:
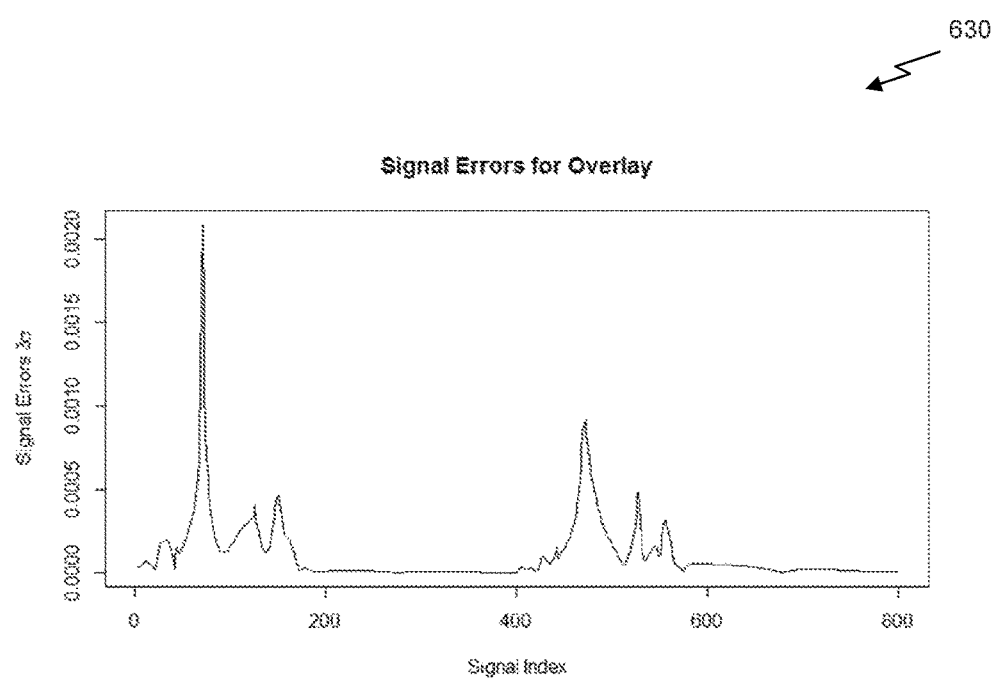
FIG. 6C illustrates a chart of the deviation of or for a plurality of measurements, in accordance with one embodiment.

FIG. 6B illustrates a chart 620 of the error between a set of converted signals after calibration of the metrology tool and a set of reference signals, in accordance with one embodiment. The error may be calculated by taking a difference in a value measured with the calibrated metrology tool T and a corresponding value measured with the reference tool $T_r$ for each of a plurality of signals. FIG. 6C illustrates a chart 630 of the deviation of the error for a plurality of measurements, in accordance with one embodiment. The deviation of the error is plotted as a 3-sigma (3σ) value, which means that over 99% of the measurements taken with the calibrated metrology tool T will fall within the error shown in the chart 630 of FIG. 6C.

Figure 7:
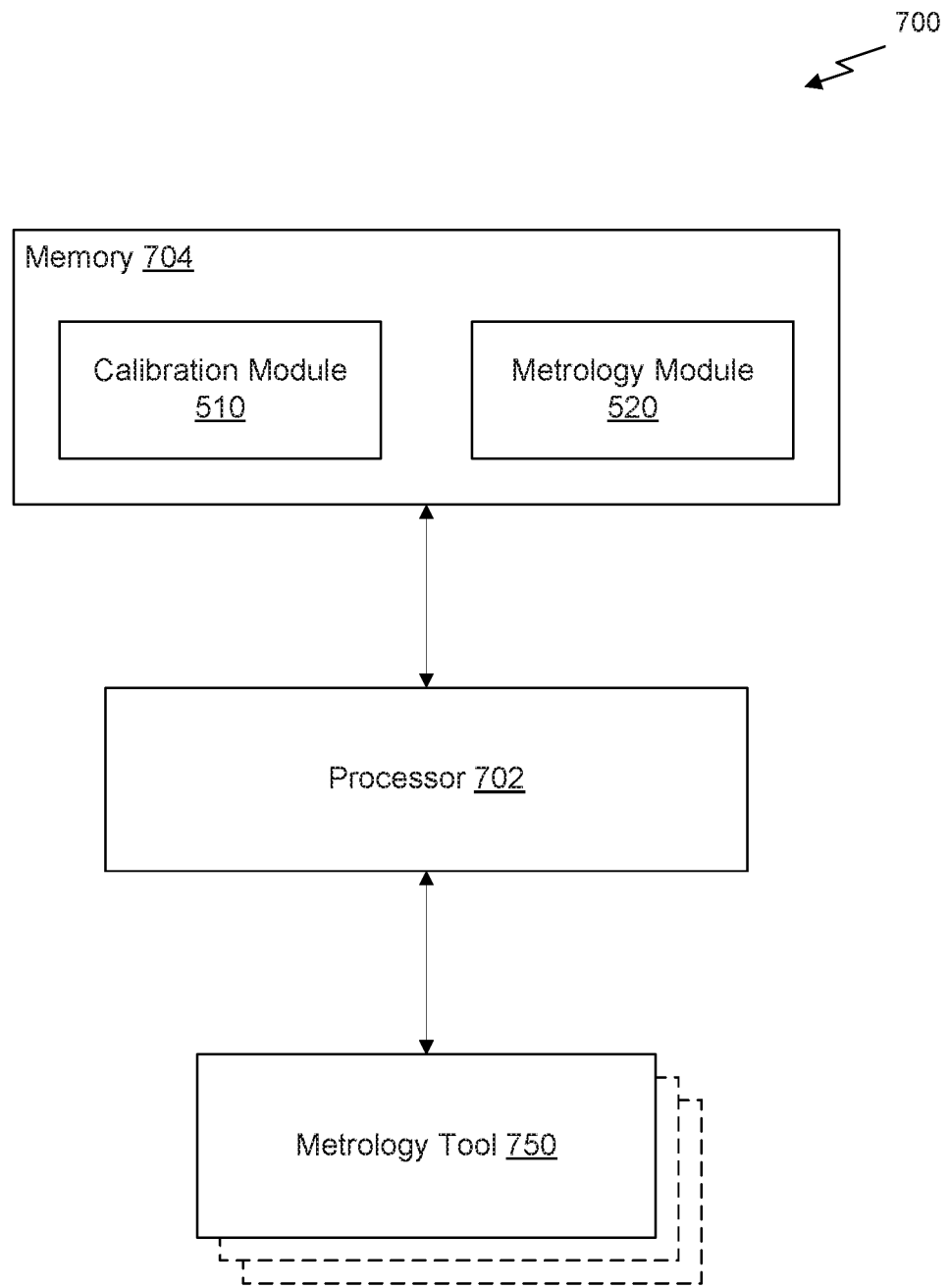
FIG. 7 illustrates an exemplary system in which the various architecture and/or functionality of the various previous embodiments may be implemented.

FIG. 7 illustrates an exemplary system in which the various architecture and/or functionality of the various previous embodiments may be implemented. As shown, a system 700 is provided including at least a processor 702 and a memory 704 associated with one or more metrology tools 750. The memory 704 may include both volatile and non-volatile memory for storing program instructions and/or data. In one embodiment, the memory 704 includes a hard disk drive (HDD) storing the calibration module 510 and the metrology module 520 and SDRAM, on which an operating system, application(s), calibration module 510, and metrology module 520 may be loaded during execution.

One embodiment relates to a non-transitory computer-readable medium storing program instructions executable on a computer system for performing a computer-implemented method, such as the methods discussed herein. Program instructions implementing methods, such as those described herein, may be stored on a computer-readable medium, such as memory 704. The computer-readable medium may be a storage medium such as a magnetic or optical disk, or a magnetic tape or any other suitable non-transitory computer-readable medium known in the art. As an option, the computer-readable medium may be located within system 700. Alternatively, the computer-readable medium may be external to system 700, where system 700 is configured to load the program instructions from the computer readable medium into memory 704.

The program instructions may be implemented in any of various ways, including procedure-based techniques, component-based techniques, and/or object-oriented techniques, among others, For example, the program instructions may be implemented using ActiveX controls, C++ objects, JavaBeans, Microsoft Foundation Classes ("MFC"), or other technologies or methodologies, as desired.

The system 700 may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The system 700 may also include any suitable processor known in the art such as a parallel processor. In addition, the system 700 may include a computer platform with high speed processing and software, either as a standalone or a networked tool.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

receiving one or more DoE (design-of-experiments) wafers for calibrating a metrology tool, the one or more DoE wafers including a plurality of metrology targets and the plurality of metrology targets including at least one of a periodic grating, a FinFet structure, an SRAM device structure, a Flash memory structure, and a DRAM memory structure;

collecting a set of signals by measuring the one or more DoE wafers utilizing the metrology tool;

analyzing the set of signals, utilizing analysis logic or an autoencoder, to determine a portion of principal components of the set of signals;

determining a first transformation that converts the set of signals to the determined portion of principal components;

converting the set of signals to components, using the first transformation;

identifying a set of reference signals collected by either: a reference metrology tool measuring the one or more DoE wafers, or a simulation performed based on measurement parameters associated with the metrology tool and associated with the one or more DoE wafers;

analyzing the set of reference signals, utilizing the analysis logic or the autoencoder, to determine a portion of principal reference components of the set of reference signals;

determining a second transformation that converts the set of reference signals to the determined portion of principal reference components;

converting the set of reference signals to reference components, using the second transformation;

training a model, using a machine learning algorithm or a neural network, that takes as input the components and the reference components to map the components to converted components; and storing the model, first transformation, and second transformation in a memory associated with the metrology tool for use in calibrating the metrology tool.

2. The method of claim 1, wherein the model comprises one of a linear model and a nonlinear model.

3. The method of claim 1, wherein the model comprises one of a neural network, a random forest, a support vector machine (SVM), a deep network, and a convolution network.

4. The method of claim 1, wherein the set of signals is analyzing using principal component analysis (PCA).

5. The method of claim 1, wherein the metrology tool is selected from one of:

a spectroscopic ellipsometer (SE);
a SE with multiple angles of illumination;
a SE measuring Mueller matrix elements;
a single-wavelength ellipsometer;
a beam profile ellipsometer;
a beam profile reflectometer;
a broadband reflective spectrometer;
a single-wavelength reflectometer;
an angle-resolved reflectometer;
an imaging system;
a scatterometer;

a small-angle x-ray scattering (SAXS) device;
an x-ray powder diffraction (XRD) device;
an x-ray Fluorescence (XRF) device;
an x-ray photoelectron spectroscopy (XPS) device;
an x-ray reflectivity (XRR) device;
a Raman spectroscopy device;
a scanning electron microscopy (SEM) device;
a tunneling electron microscope (TEM) device; and
an atomic force microscope (AFM) device.

6. The method of claim 1, wherein at least one of the first transformation and the second transformation incorporates noise reduction.

7. The method of claim 1, wherein training the model comprises minimizing a difference between the converted components and the reference components.

8. The method of claim 1, wherein training the model comprises minimizing a difference between structural parameters based on the converted components and structural parameters based on the reference components.

9. A computer program product embodied on a non-transitory computer readable medium, the computer program product including code adapted to be executed by a computer to perform a method comprising:
receiving one or more DoE (design-of-experiments) wafers for calibrating a metrology tool, the one or more DoE wafers including a plurality of metrology targets and the plurality of metrology targets including at least one of a periodic grating, a FinFet structure, an SRAM device structure, a Flash memory structure, and a DRAM memory structure;
collecting a set of signals by measuring the one or more DoE wafers utilizing the metrology tool;
analyzing the set of signals, utilizing analysis logic or an autoencoder, to determine a portion of principal components of the set of signals;
determining a first transformation that converts the set of signals to the determined portion of principal components;
converting the set of signals to components, using the first transformation;
identifying a set of reference signals collected by either:
a reference metrology tool measuring the one or more DoE wafers, or a simulation performed based on measurement parameters associated with the metrology tool and associated with the one or more DoE wafers;
analyzing the set of reference signals, utilizing the analysis logic or the autoencoder, to determine a portion of principal reference components of the set of reference signals;
determining a second transformation that converts the set of reference signals to the determined portion of principal reference components;
converting the set of reference signals to reference components, using the second transformation;
training a model, using a machine learning algorithm or a neural network, that takes as input the components and the reference components to map the components to converted components; and
storing the model, first transformation, and second transformation in a memory associated with the metrology tool for use in calibrating the metrology tool.

10. The computer program product of claim 9, wherein training the model comprises minimizing a difference between the converted components and the reference components.

11. A system, comprising:
one or more DoE (design-of-experiments) wafers;
a metrology tool configured to collect a set of signals by measuring the one or more DoE wafers, the one or more DoE wafers including a plurality of metrology targets and the plurality of metrology targets including at least one of a periodic grating, a FinFet structure, an SRAM device structure, a Flash memory structure, and a DRAM memory structure;
a memory associated with the metrology tool; and
a processor configured to:
analyze the set of signals, utilizing analysis logic or an autoencoder, to determine a portion of principal components of the set of signals;
determine a first transformation that converts the set of signals to the determined portion of principal components,
convert the set of signals to components, using the first transformation, identify a set of reference signals collected by either:
a reference metrology tool measuring the one or more DoE wafers, or
a simulation performed based on measurement parameters associated with the metrology tool and associated with the one or more DoE wafers,
analyze the set of reference signals, utilizing the analysis logic or the autoencoder, to determine a portion of principal reference components of the set of reference signals,
determine a second transformation that converts the set of reference signals to the determined portion of principal reference components,
convert the set of reference signals to reference components, using the second transformation,
train a model, using a machine learning algorithm or a neural network, that takes as input the components and the reference components to map the components to converted components, and
store the model, first transformation, and second transformation in the memory for use in calibrating the metrology tool.

12. The system of claim 11, wherein the processor executes:
a calibration module configured to determine the first transformation, determine the second transformation, and train the model; and
a metrology module configured to convert a set of converted signals into structural parameters based on a recipe.

* * * * *